United States Patent
Prasky et al.

(10) Patent No.: US 12,327,122 B2
(45) Date of Patent: Jun. 10, 2025

(54) BRANCH PREDICTION USING SPECULATIVE INDEXING AND INTRALINE COUNT

(71) Applicant: INTERNATIONAL BUSINESS MACHINES CORPORATION, Armonk, NY (US)

(72) Inventors: Brian Robert Prasky, Campbell Hall, NY (US); James Bonanno, Liberty Hill, TX (US); Adam Benjamin Collura, Hopewell Junction, NY (US); Edward Thomas Malley, Eastchester, NY (US); Deepankar Bhattacharjee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 17/703,063

(22) Filed: Mar. 24, 2022

(65) Prior Publication Data

US 2023/0305850 A1  Sep. 28, 2023

(51) Int. Cl.
G06F 9/38  (2018.01)
(52) U.S. Cl.
CPC .................. G06F 9/3844 (2013.01)
(58) Field of Classification Search
CPC ................................................. G06F 9/3844
See application file for complete search history.

(56) References Cited

U.S. PATENT DOCUMENTS

| | | | |
|---|---|---|---|
| 7,082,520 B2 | 7/2006 | Bonanno et al. | |
| 7,870,371 B2 | 1/2011 | Mutlu et al. | |
| 9,632,789 B2 | 4/2017 | Bonanno et al. | |
| 9,639,368 B2 | 5/2017 | Bonanno et al. | |
| 10,534,611 B2 | 1/2020 | Bonanno et al. | |
| 2013/0339692 A1* | 12/2013 | Bonanno | G06F 9/3804 712/238 |
| 2015/0363202 A1* | 12/2015 | Bonanno | G06F 9/46 712/240 |
| 2015/0363204 A1* | 12/2015 | Bonanno | G06F 9/3844 712/240 |

(Continued)

FOREIGN PATENT DOCUMENTS

CN  105204819  12/2015

OTHER PUBLICATIONS

Adiga, Narasimha, et al. "The IBM z15 high frequency mainframe branch predictor industrial product." 2020 ACM/IEEE 47th Annual International Symposium on Computer Architecture (ISCA). IEEE, 2020, pp. 27-39 (Year: 2020).*

(Continued)

*Primary Examiner* — Keith E Vicary
(74) *Attorney, Agent, or Firm* — Nicholas Welling; Andrew D. Wright; Calderon Safran & Wright P.C.

(57) ABSTRACT

A method of branch prediction in a processor includes: obtaining, by the processor, a branch instruction for which a direction of a branch is to be predicted; generating, by the processor, an index based on an instruction address, a global path vector (GPV), and a counter; selecting, by the processor, an entry from a data structure using the index; and predicting, by the processor, the direction of the branch using information included in the selected entry. The method may include modifying a tag in the selected entry based at least in part on another GPV.

15 Claims, 12 Drawing Sheets

(56) References Cited

U.S. PATENT DOCUMENTS

2016/0034280 A1* 2/2016 Bonanno ............... G06F 9/3848
712/240

OTHER PUBLICATIONS

Jacobi, Christian, et al. "Design of the IBM z14 microprocessor." IBM Journal of Research and Development vol. 62 No. 2/3 (2018): pp. 8:1 to 8:11 (Year: 2018).*

Rossbach, Paul, "The Correlation Branch Target Address Cache (BTAC)," Motorola Inc., IPCOM000007765D, IP.com, Aug. 1, 1996, 4 pages.

Mittal, "A Survey of Techniques for Dynamic Branch Prediction", https://arxiv.org/pdf/1804.00261.pdf, Apr. 1, 2018, 37 pages.

* cited by examiner

BRANCH PREDICTION USING SPECULATIVE INDEXING AND INTRALINE COUNT

BACKGROUND

Aspects of the present invention relate generally to computer processing and, more particularly, to branch prediction in a processor.

Branch prediction is a type of metadata prediction that is a performance-critical component of a pipelined high frequency microprocessor. It is used to predict the direction (taken vs. not taken) and the target address of branch instructions. This is beneficial because it allows processing to continue along a branch's predicted path rather than having to wait for the outcome of the branch to be determined. A penalty is incurred only if a branch is mispredicted.

A branch target buffer (BTB) is a structure that stores branch and target information. Other structures such as a branch history table (BHT), pattern history table (PHT), and multiple target table (MTT), can be included to store additional information used for branch direction and target prediction.

The BTB can be searched in parallel to and independently from instruction fetching to find upcoming branches, in which case it is called lookahead branch prediction. Alternatively, it can be accessed simultaneously with or after fetching instructions and determining instruction boundaries in order to provide a prediction for each encountered branch instruction, in which case it is called synchronous branch prediction. In either case the performance benefit of the BTB is a function of the accuracy of the prediction provided from the BTB and the latency required to access the BTB.

The output of a predictor, like the BTB, can be read and cached for reuse to make predictions repeatedly while staying in the same section of code that can be called a line of code. This is a prediction cache or line output buffer (LOB). Such a design consists of an index pipeline to index the BTB and read its content and put it into the LOB, and a prediction pipeline to make predictions from the LOB content.

Pattern-based metadata predictors utilize history of prior instructions to make predictions about current ones. Traditionally this history consists of the branch direction history or taken branch instruction addresses. The history vector can be combined with the branch instruction address to form an index into a pattern history table (PHT) or multiple target table (MTT).

SUMMARY

In a first aspect of the invention, there is a method of branch prediction in a processor, the method including: obtaining, by the processor, a branch instruction for which a direction of a branch is to be predicted; generating, by the processor, an index based on an instruction address, a global path vector (GPV), and a counter; selecting, by the processor, an entry from a data structure using the index; and predicting, by the processor, the direction of the branch using information included in the selected entry.

In another aspect of the invention, there is a method of branch prediction in a processor, the method including: generating a new line index and an intraline index; generating a first output of a pattern-based predictor structure using the new line index; generating a second output of the pattern-based predictor structure using the intraline index; selecting one of the first output and the second output based on a result of a prediction pipeline; and predicting a direction of a branch using the selected one of the first output and the second output.

In another aspect of the invention, there is computer system for branch prediction in a processing pipeline, the system including a memory and a processor operatively coupled to the memory. The computer system is configured to: generate a first output of a pattern-based predictor structure and a second output of the pattern-based predictor structure by generating a new line index of the pattern-based predictor structure and an intraline index of the pattern-based predictor structure using a line entry instruction address, a global path vector (GPV) leading up to the line entry instruction address, and an intraline counter of predicted taken branches, wherein the pattern-based predictor structure has a first read port associated with the new line index and a second read port associated with the intraline index.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
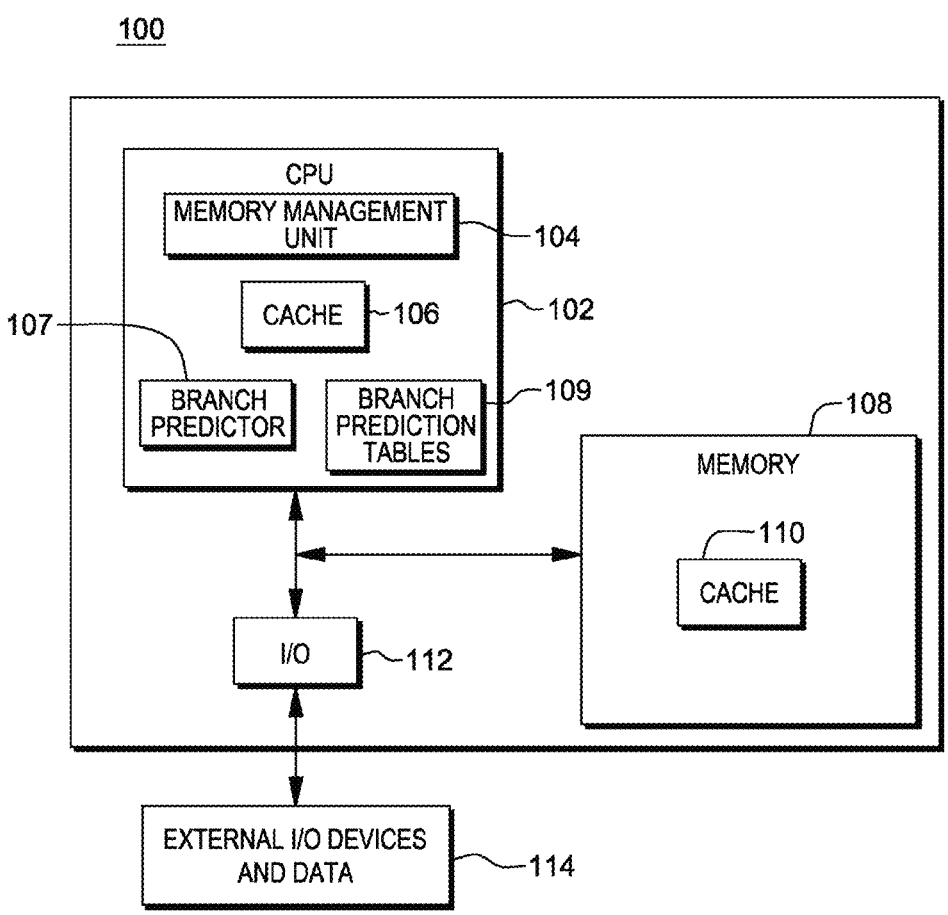
FIG. 1 depicts one example of a computing environment to incorporate and use one or more aspects of a branch prediction capability in accordance with aspects of the invention.

Aspects of the present invention relate generally to computer processing and, more particularly, to branch prediction in a processor. Pattern history tables (PHT) are often used in branch prediction. In general, a PHT selects a static random short length of branch history for table indexing and records the outcome of a given branch based on the pattern to get to the given branch. Another system used in branch prediction is TAGE (TAgged GEometric length predictor), which stores a tag along with the history prediction for each branch entry. TAGE supports multiple tables each with a different pattern history. In TAGE, longer history lengths may hash reduce into fewer bits of indexing, which introduces aliasing within the given history table.

In such systems, history lengths are picked at coordinated randomness and are static for the life of the hardware. The static nature is less than optimal, however, and it would be advantageous to use a dynamic history length and not be limited to a fixed history length.

Using more tables results in a larger storage footprint and slower learning. It would be advantageous to provide a system that uses a smaller footprint and learns faster.

Some systems employ plural tables to make plural different predictions for a single branch and then use logic to select which one of the predictions to use. In such systems, a first table may be based on a global history path and a second table may be based on a counter value past an anchoring point. The concept of counting past a given anchor point has been shown to provide benefit. However, the use of plural tables to make plural predictions for a single branch is still inefficient. Accordingly, it would be advantageous to provide a system that defines anchor points in a manner that leverages the counting scheme but that does not utilize plural tables to make plural predictions for a single branch.

Moreover, no conventional system provides a way to incorporate pattern-based predictors into a system with a primary predictor cache. Because pattern-based predictors typically require history updated with all previous branch predictions, they cannot be indexed until after such predictions are made. A straightforward implementation would require waiting for such predictions to be made before indexing the pattern tables.

An advantage of a metadata prediction cache is to avoid latency of having to re-index the primary predictor, such as a BTB. But it does not provide a way to incorporate pattern-based tables without incurring extra latency for re-indexing them after a prediction is made.

Implementations of the invention address these issues by indexing pattern-based predictors as a function of history state and address information upon entering into a line of code along with an intraline count updated while making predictions that stay within the line. This provides a way to speculatively index the pattern-based structures with multiple read ports before it is known whether current predictions will stay intraline or require a new line. This provides for using prediction pipeline indications to select among the outputs from the multiple read ports and either use that information immediately in the prediction pipeline or hold it for later when needed. In this manner, implementations of the invention advantageously allow the incorporation of pattern-based predictors in systems including a line-based primary predictor cache without requiring extra latency for using the pattern-based predictors.

Implementations of the invention also address the issues described above by defining an anchor point as the entry point into a region of code (such as a line of code), and by generating a PHT index based on three factors including: an instruction address (IA) of the entry point; a count value past the anchoring point; and a global history of taken branches leading into the entry point. In embodiments, global history knowledge from within the line is not accounted for in forming the index for non-zero count values. In embodiments, the system modifies the tag contained with the PHT from being only branch IA bits to including knowledge of the branch path taken to the anchor point. This may include the most recent bits of a global path vector (GPV) or may be a hash of taken IA (e.g., bits 50-62) of all taken branches since that of the anchor point.

In this manner, implementations of the invention provide a branch predictor that generates a PHT index based on: a function of line entry; leveraging a GPV that is up to the branches that got to the anchoring line of interest; and introducing a count value that is XOR'd into the above values. In embodiments, as the count value increases, the amount of GPV may be reduced. In embodiments, the system modifies the PHT tag to include path vector knowledge up to the branch of interest that is being predicted, which may be a GPV of the last "X" number of branches. In some embodiments, the anchor point is based on static regions of code, such as a 128B line of code. The region size of code may be larger than the line size. In some embodiments, the region size is not static in nature but is defined by dynamic events such as a multi-target branch and/or a flush denoting a new boundary.

Computing environments of different architectures may incorporate and use one or more aspects of the branch prediction capability provided herein. For instance, environments based on the z/Architecture, offered by International Business Machines Corporation (IBM®) may include one or more aspects, as well as computing environments of other architectures, including but not limited to, the PowerPC architecture, also referred to as Power ISA, also offered by International Business Machines Corporation. IBM, Z/ARCHITECTURE, Z/OS, Z/VM, z/VSE, POWER, and POWERPC (referenced herein) are registered trademarks of International Business Machines Corporation, Armonk, N.Y. Other names used herein may be registered trademarks, trademarks or product names of International Business Machines Corporation or other companies.

One example of a computing environment to incorporate and use one or more aspects of the branch prediction capability is described with reference to FIG. 1. In one example, a computing environment 100 includes a processor (e.g., central processing unit, CPU, etc.) 102 that includes at least one memory management unit 104 to manage the memory and provide, for instance, address translation; one or more caches 106; a branch predictor 107 to facilitate predicting the direction of branches; and one or more branch prediction tables 109 used by the branch predictor to predict the direction of a branch (referred to herein as branch prediction). In one embodiment, the branch predictor includes the branch prediction logic, while the branch prediction tables are separate. However, in other embodiments, the branch predictor includes the branch prediction logic and the branch prediction tables.

Processor 102 is communicatively coupled to a memory portion 108 having one or more caches 110, and to an input/output (I/O) subsystem 112. I/O subsystem 112 is communicatively coupled to external I/O devices and data 114 that may include, for example, data input devices, sensors and/or output devices, such as displays.

Figure 2:
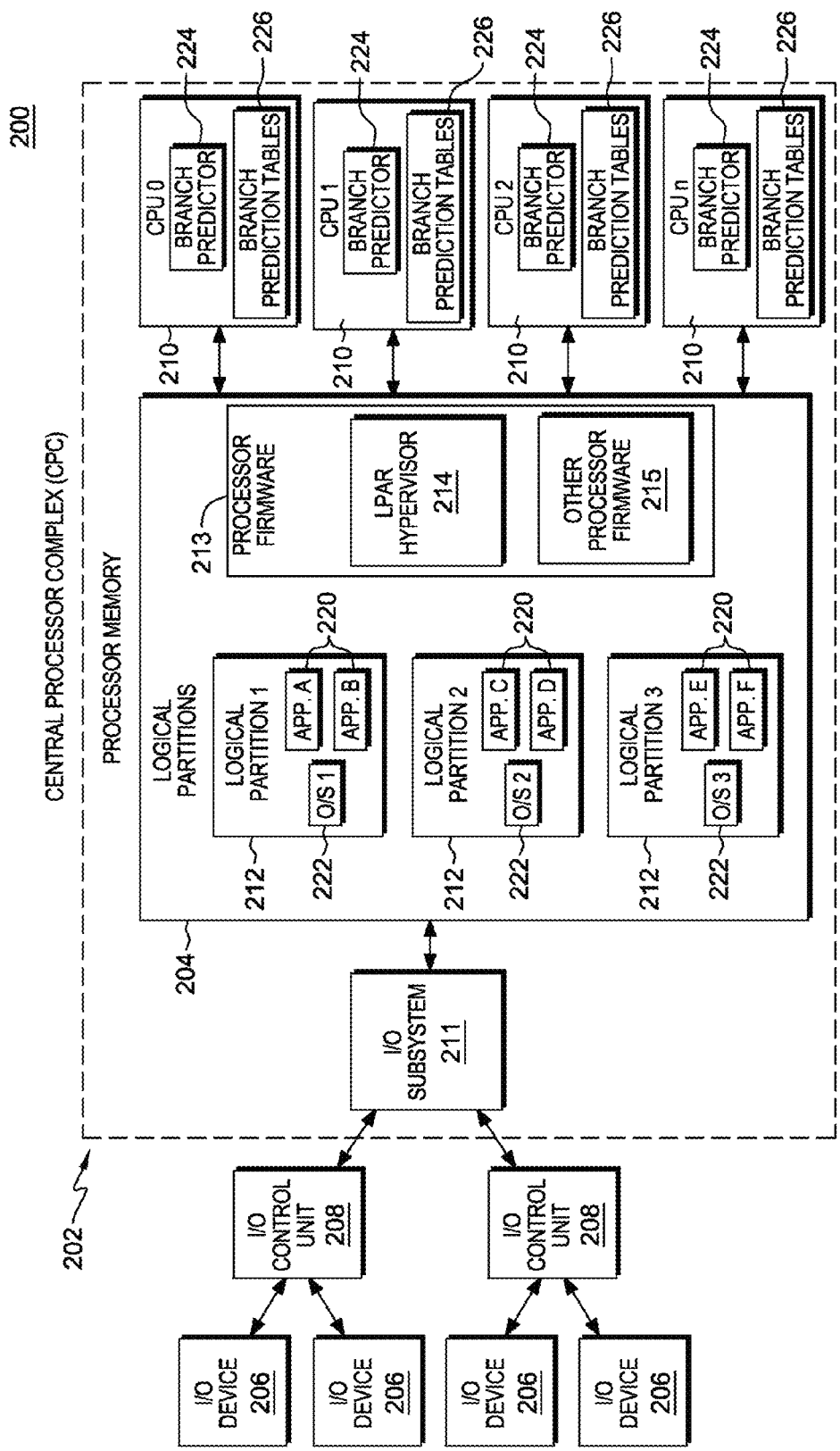
FIG. 2 depicts another example of a computing environment to incorporate and use one or more aspects of a branch prediction capability in accordance with aspects of the invention.

Another embodiment of a computing environment to incorporate and use one or more aspects of the branch prediction capability is described with reference to FIG. 2. Referring to FIG. 2, in one example, a computing environment 200 is based on the z/Architecture, offered by International Business Machines Corporation, Armonk, N.Y. Computing environment 200 includes, for example, a central processor complex (CPC) 202 coupled to one or more input/output (I/O) devices 206 via one or more control units 208. Central processor complex 202 includes, for instance, a processor memory 204 (a.k.a., main memory, main storage, central storage) coupled to one or more central processors (a.k.a., central processing units (CPUs)) 210, and an input/output subsystem 211, each of which is described below.

Processor memory 204 includes, for example, one or more partitions 212 (e.g., logical partitions), and processor firmware 213, which includes, for instance, a logical partition hypervisor 214 and other processor firmware 215. One example of logical partition hypervisor 214 is the Processor Resource/System Manager (PR/SM), offered by International Business Machines Corporation, Armonk, N.Y.

A logical partition functions as a separate system and has one or more applications 220, and optionally, a resident operating system 222 therein, which may differ for each logical partition. In one embodiment, the operating system is the z/OS operating system, the z/VM operating system, the z/VSE operating system, or the TPF operating system, offered by International Business Machines Corporation, Armonk, N.Y.

Logical partitions 212 are managed by logical partition hypervisor 214, which is implemented by firmware running on processors 210. As used herein, firmware includes, e.g., the microcode and/or millicode of the processor. It includes, for instance, the hardware-level instructions and/or data structures used in implementation of higher-level machine code. In one embodiment, it includes, for instance, proprietary code that is typically delivered as microcode that includes trusted software or microcode specific to the underlying hardware and controls operating system access to the system hardware.

Central processors 210 are physical processor resources allocated to the logical partitions. In particular, each logical partition 212 has one or more logical processors, each of which represents all or a share of a physical processor 210 allocated to the partition. The logical processors of a particular partition 212 may be either dedicated to the partition, so that the underlying processor resource 210 is reserved for that partition; or shared with another partition, so that the underlying processor resource is potentially available to another partition.

Central processors 210 include, in one embodiment, a branch predictor 224 used along with branch prediction tables 226 to predict the direction of branches included in instruction streams. Again, the branch prediction tables may be considered a part of the branch predictor or separate therefrom.

Input/output subsystem 211 directs the flow of information between input/output devices 206 and main storage 204. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can be used.

The I/O subsystem uses one or more input/output paths as communication links in managing the flow of information to or from input/output devices 206. In this particular example, these paths are called channel paths, since the communication adapters are channels.

Figure 3A:
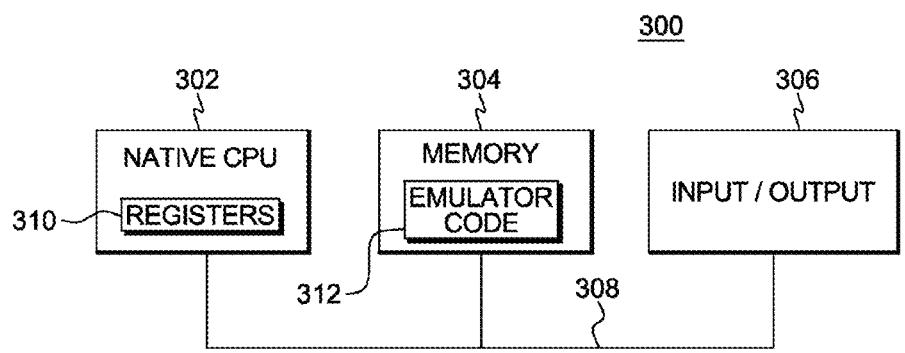
FIG. 3A depicts yet another example of a computing environment to incorporate and use one or more aspects of a branch prediction capability in accordance with aspects of the invention.

Another embodiment of a computing environment to incorporate and use one or more aspects of the branch prediction capability is described with reference to FIG. 3A. In this example, a computing environment 300 includes, for instance, a native central processing unit (CPU) 302, a memory 304, and one or more input/output devices and/or interfaces 306 coupled to one another via, for example, one or more buses 308 and/or other connections. As examples, computing environment 300 may include a PowerPC processor, a pSeries server or an xSeries server offered by International Business Machines Corporation, Armonk, N.Y.

Native central processing unit 302 includes one or more native registers 310, such as one or more general purpose registers and/or one or more special purpose registers used during processing within the environment. These registers include information that represent the state of the environment at any particular point in time.

Moreover, native central processing unit 302 executes instructions and code that are stored in memory 304. In one particular example, the central processing unit executes emulator code 312 stored in memory 304. This code enables the computing environment configured in one architecture to emulate another architecture. For instance, emulator code 312 allows machines based on architectures other than the z/Architecture, such as PowerPC processors, pSeries servers, xSeries servers or others, to emulate the z/Architecture and to execute software and instructions developed based on the z/Architecture.

Figure 3B:
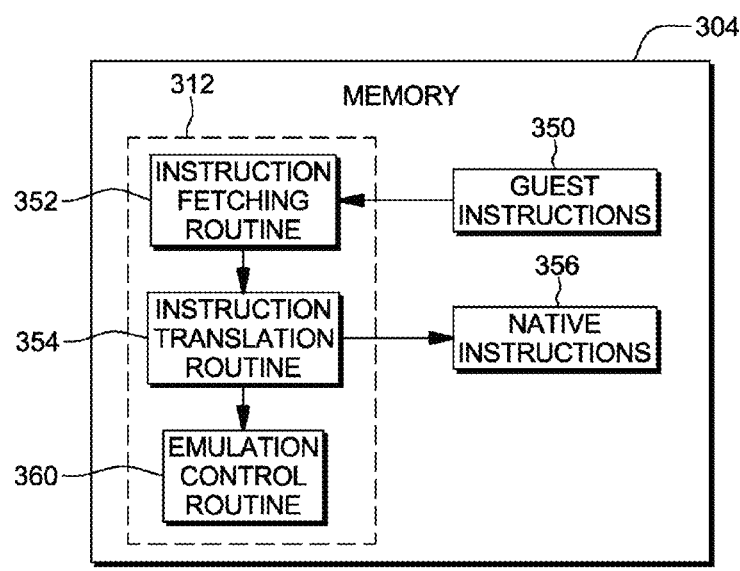
FIG. 3B depicts further details of the memory of FIG. 3A.

Further details relating to emulator code 312 are described with reference to FIG. 3B. Guest instructions 350 stored in memory 304 comprise software instructions (e.g., correlating to machine instructions) that were developed to be executed in an architecture other than that of native CPU 302. For example, guest instructions 350 may have been designed to execute on a z/Architecture processor 102, but instead, are being emulated on native CPU 302, which may be, for example, an Intel Itanium II processor. In one example, emulator code 312 includes an instruction fetching routine 352 to obtain one or more guest instructions 350 from memory 304, and to optionally provide local buffering for the instructions obtained. It also includes an instruction translation routine 354 to determine the type of guest instruction that has been obtained and to translate the guest instruction into one or more corresponding native instructions 356. This translation includes, for instance, identifying the function to be performed by the guest instruction and choosing the native instruction(s) to perform that function.

Further, emulator code 312 includes an emulation control routine 360 to cause the native instructions to be executed. Emulation control routine 360 may cause native CPU 302 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 356 may include loading data into a register from memory 304; storing data back to memory from a register; or performing some type of arithmetic or logic operation, as determined by the translation routine.

Each routine is, for instance, implemented in software, which is stored in memory and executed by native central processing unit 302. In other examples, one or more of the routines or operations are implemented in firmware, hardware, software or some combination thereof. The registers of the emulated processor may be emulated using registers 310 of the native CPU or by using locations in memory 304. In embodiments, guest instructions 350, native instructions 356 and emulator code 312 may reside in the same memory or may be disbursed among different memory devices.

The computing environments described above are only examples of computing environments that can be used. Other environments, including but not limited to, other non-partitioned environments, other partitioned environments, and/or other emulated environments, may be used; embodiments are not limited to any one environment.

Each of the computing environments described above may include a processing system that may be included within a computer processor or otherwise distributed within a computing environment. In one example, referring to FIG. 4, a processing system 400 includes a memory 402, an instruction cache 404, an instruction fetch unit 408, and a processing pipeline 406. Instructions and data may be stored in memory 402, and instruction cache 404 may access instructions in memory 402 and store the instructions to be fetched. Memory 402 may include any type of volatile or non-volatile memory, such as cache memory. Memory 402 and instruction cache 404 may include multiple cache levels. A data cache (not depicted) may also be included in processing system 400.

Instruction fetch unit 408 includes a branch predictor 418 that includes the branch prediction logic and, in one embodiment, the branch prediction tables of one or more aspects described herein. Alternatively, branch predictor 418 may be located apart from instruction fetch unit 408, and/or the tables may be separate therefrom. In one example, the branch predictor 418 comprises a lookahead asynchronous branch predictor.

Figure 4:
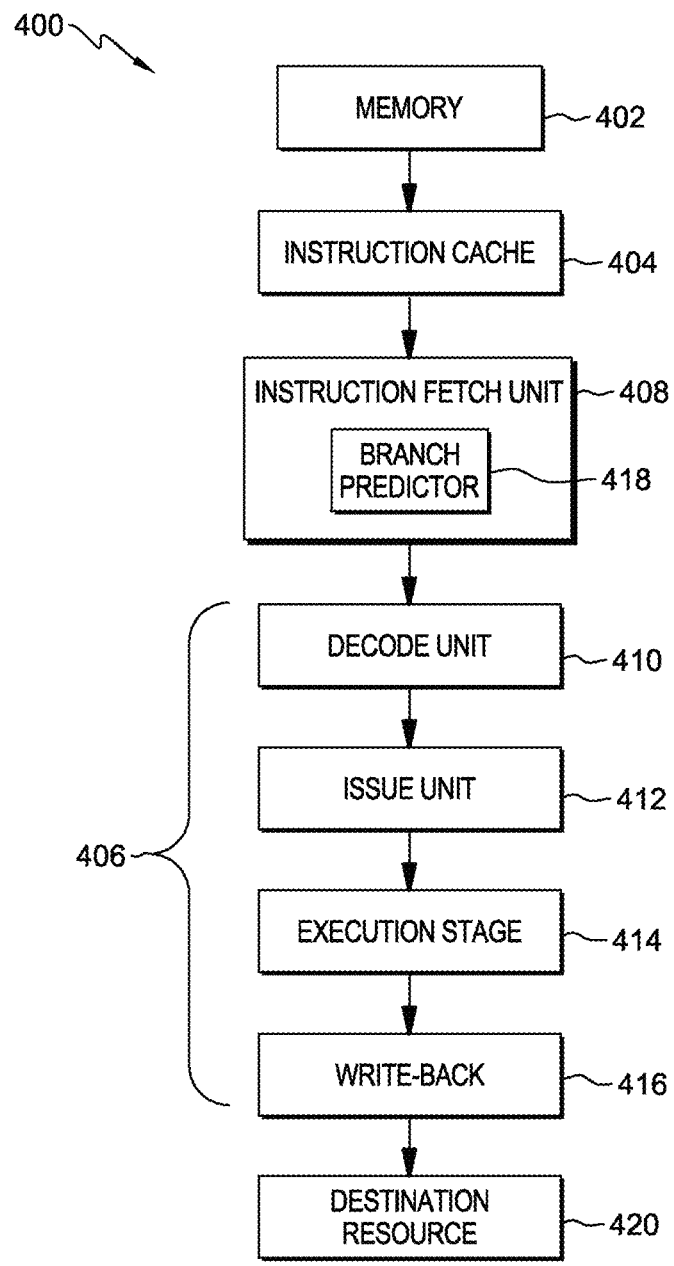
FIG. 4 depicts one example of a processing system to use branch prediction in accordance with aspects of the invention.

Processing pipeline 406 includes a decode unit 410, an issue unit 412, an execution stage 414, and write-back logic 416. The entire instruction fetch unit 408 or branch predictor 418 may also be part of processing pipeline 406. Processing pipeline 406 can include other features, such as error checking and handling logic, one or more parallel paths through processing pipeline 406, and other features known in the art. Further, processing system 400 can include multiple processing pipelines 406 and instruction fetch units 408. While a forward path through processing system 400 is depicted in FIG. 4, other feedback and signaling paths may be included between elements of processing system 400.

Decode unit 410 decodes instructions and passes the decoded instructions, portions of the instructions, or other decoded data to issue unit 412. Issue unit 412 analyzes the instructions or other data and transmits the decoded instructions, portions of the instructions, or other data to one or more execution units in execution stage 414 based on the analysis. Execution stage 414 executes the instructions, and may include a plurality of execution units, such as fixed-point execution units, floating point execution units, load/store execution units, and vector execution units, as examples. Write-back logic 416 writes results of instruction execution back to a destination resource 420. Destination resource 420 may be any type of resource, including, for instance, registers, cache memory, other memory, I/O circuitry to communicate with other devices, other processing circuits, or any other type of destination for executed instructions or data.

In accordance with one or more aspects, a branch predictor (e.g., branch predictor 107, branch predictor 224, or branch predictor 418, as examples) uses a branch prediction structure to predict the direction of a branch. In embodiments, the branch prediction structure comprises a pattern history table (PHT). In embodiments, the branch predictor may include plural PHTs; however, according to aspects of the invention, only a single PHT is used to make any given branch prediction. Each PHT is implemented, in one example, as an n-way (e.g., 4-way) set associative structure used to hold a saturation counter for each branch to be predicted. A saturation counter records a 4-state value to enable branch direction to be predicted. The four states include, for instance: 0—strongly not taken; 1—weakly not taken; 2—weakly taken; and 3—strongly taken. As each branch is taken, the saturation counter is incremented; an increment to a value of, e.g., 3 saturates and remains at 3. When a branch that is encountered is not taken, the saturation counter is decremented; a decrement to a value of, e.g., 0 saturates and remains at 0.

In embodiments, the PHT is used to predict whether a branch is to be taken or not taken. It is indexed using a function of the address of the branch to be predicted and the branch history (i.e., the outcome of the immediately preceding branches). In embodiments, the index is generated using a function of: (i) an address of a region of code that includes the branch being predicted, (ii) a global history of branches leading into the region of code that includes the branch being predicted, and (iii) a counter that is based on a number of predicted taken branches within the region of code that includes the branch being predicted.

Figure 5:
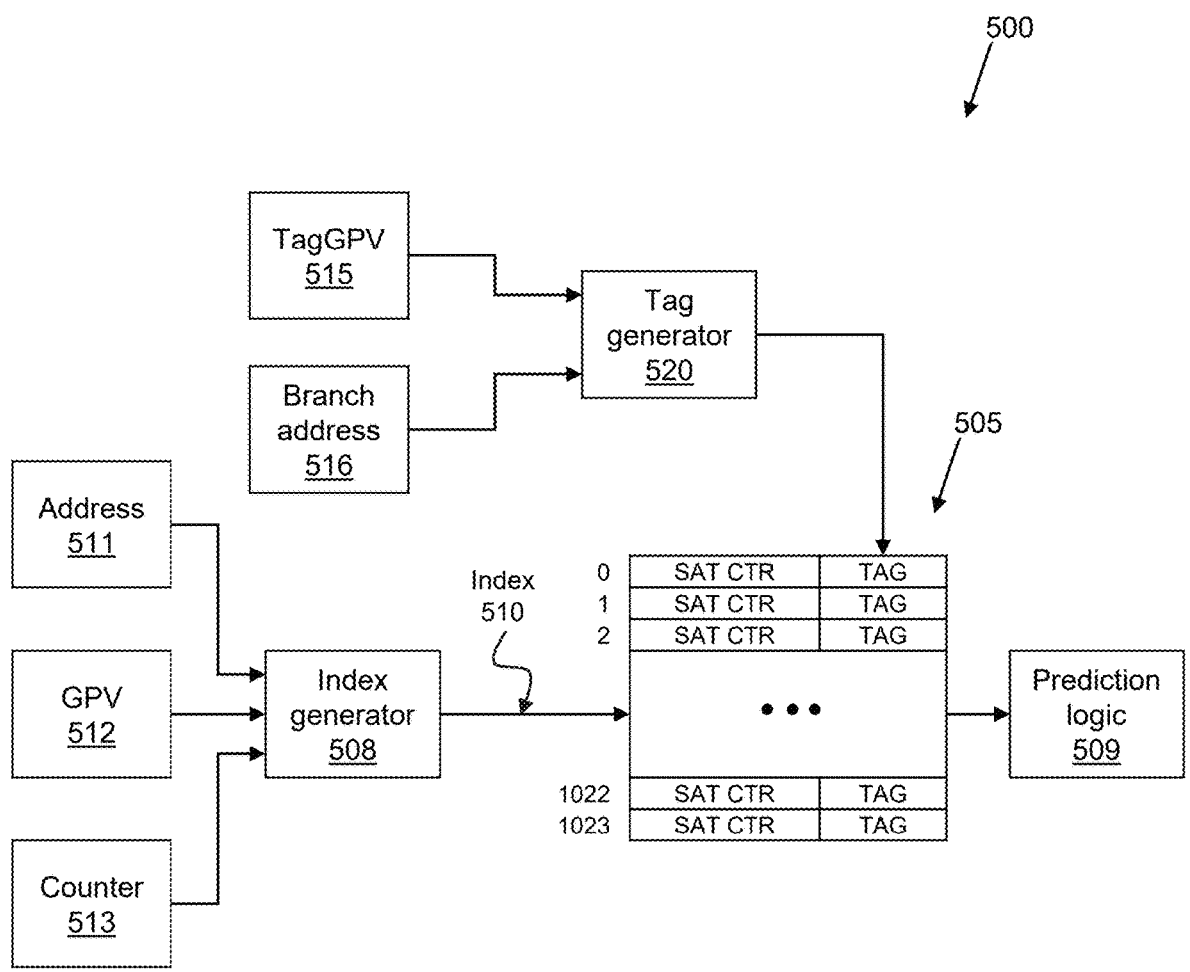
FIG. 5 shows an example of logic for generating an index used with a pattern history table in accordance with aspects of the invention.

FIG. 5 shows an embodiment of logic 500 for generating an index used with a pattern history table (PHT) when making a branch prediction in accordance with aspects of the invention. The logic may be included in a branch predictor (e.g., branch predictor 107, branch predictor 224, or branch predictor 418, as examples) and used to predict the direction (e.g., taken versus not taken) of a branch instruction that is encountered in the processing pipeline. In one example, the branch predictor comprises a lookahead asynchronous branch predictor.

In accordance with aspects of the invention, the logic 500 includes a PHT 505 and an index generator 508. In embodiments, the PHT 505 includes plural entries (e.g., 0 through 1023) where each entry includes a saturation counter (SAT CTR) and a tag (TAG). The saturation counter may comprise a 2-bit value that indicates one of four states including strongly not taken, weakly not taken, weakly taken, and strongly taken, as described herein. In embodiments, the tag of a given entry is used to compare against the address of the branch, which is being predicted, hashed with equivalent content at present to which was used to generate the tag initially. Based on a tag match, the table is deemed to have an entry for the branch that is to be predicted. Prediction logic 509 may use the output of the PHT 505 to make the prediction for a particular branch, e.g., taken versus not taken, using any suitable technique.

In accordance with aspects of the invention, the index generator 508 generates an index 510 at branch prediction time for reading the PHT 505 or at update time for writing to the PHT 505. In embodiments, the index generator 508 generates the index 510 using function of: (i) an address of a region of code that includes the branch being predicted, represented by address 511; (ii) a global history of branches leading into the region of code that includes the branch being predicted, represented by global path vector (GPV) 512; and (iii) a counter that is based on a number of predicted taken branches within the region of code, represented by counter 513. In embodiments, the function used by the index generator 508 is a 3-way exclusive OR (XOR) function that receives the address 511, GPV 512, and counter 513 as inputs and generates an index 510 as the output, although implementations are not limited to an XOR and other functions (e.g., such as other hash functions) may be used.

In embodiments, the address 511 comprises a portion of an instruction address of a region of code that includes the branch being predicted. In one example, the region is defined as a 128-byte (128B) line of the code that includes the branch being predicted, although implementations are not limited to this particular region and other regions may be used as described herein. In one example, the address 511 comprises a portion of the instruction address of the 128B line itself, for example, when the line is arrived at sequentially. In another example, the address 511 comprises a portion of the instruction address of an entry point into the 128B line, for example, when the line is arrived at due to a branching operation. In embodiments, the portion of an instruction address is a predefined number of bits of the instruction address. In one example, the instruction address is a 64-bit address of the 128B line, and the predefined number of bits includes bits 53:62 of the 64-bit address. As such, using this particular example, the address 511 comprises bits 53:62 of the 64-bit address of the entry point into the 128B line of code that contains the branch being predicted. In embodiments, a branch target buffer (BTB) is a structure that stores branch and target information including the definition of each 128B line of the code.

In embodiments, the GPV 512 comprises a vector that contains information representing a history of taken branches leading into the region of code. In one example, when a taken branch is encountered in the pipeline during execution of an application, an identifier of the taken branch, which may comprise, for example, the instruction address or the target instruction address of the taken branch, is input to a history generator function. In this example, the history generator function generates an output that is based on the instruction address or the target instruction address of the taken branch and this output is then shifted into the GPV 512. In one example, the output of the history generator function comprises a number of bits of the instruction address or the target instruction address of the taken branch. In a particular example, the target instruction address of the taken branch is a 64-bit address, and the output of the history generator function comprises bit 62 of the target instruction address of the taken branch. In this particular example, the GPV 512 includes "X" number of bits where each bit is bit 62 of a target instruction address of a taken branch leading into the region of code that includes the branch being predicted. In embodiments, older bits in the GPV 512 are shifted out as new bits are shifted in. In this manner, the GPV 512 comprises a vector of "X" number of bits that represent a sequential history of the last (e.g., most recent) "X" number of taken branches to arrive at the region of code that includes the branch being predicted. According to aspects of the invention, the GPV 512 includes information only for taken branches leading into the region of code that includes the branch being predicted, and does not include information regarding taken branches within the region of code that includes the branch being predicted.

In embodiments, the counter 513 comprises a count of a number of predicted taken branches within the region of code that includes the branch being predicted. In embodiments, the counter starts at a value of zero and is incremented each time a branch within this same region of code is predicted taken. In this manner, the counter 513 represents a number of branches past a point of interest. In embodiments, the point of interest is referred to as an anchor point and may comprise, for example, a beginning of the 128B line containing the branch being predicted or an entry point into the 128B line containing the branch being predicted. In some embodiments, as described herein, the anchor point is dynamically based on an event.

Figure 6:
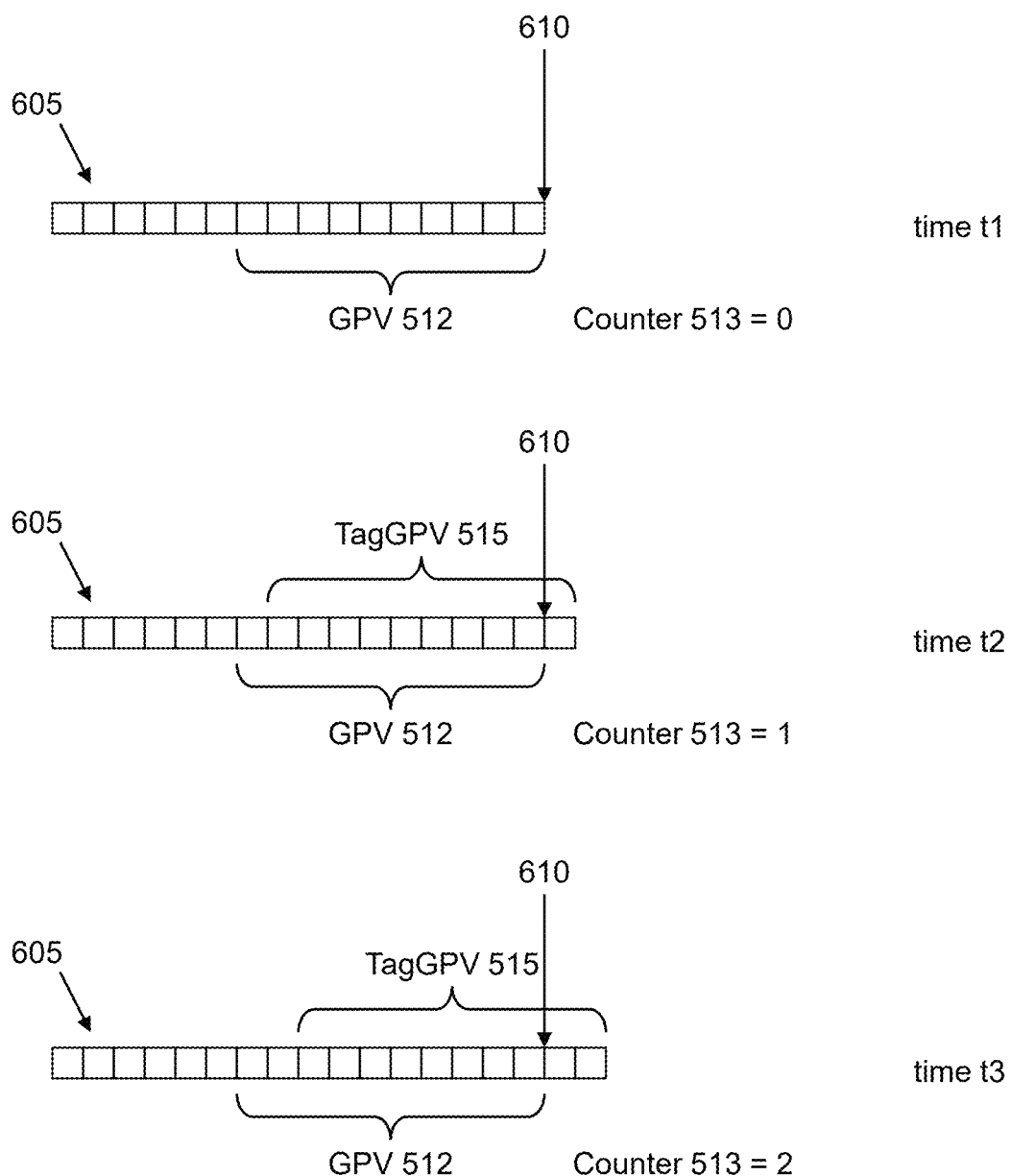
FIG. 6 shows an example of an anchor point, global path vector, and counter in accordance with aspects of the invention.

FIG. 6 shows an example of an anchor point, GPV, and counter in accordance with aspects of the invention. In embodiments, data structure 605 represents a history of taken branches in sequential order from oldest (on the left) to most recent (on the right). Each cell in the data structure 605 may contain a bit that represents a taken branch, such as bit 62 of a target instruction address of a taken branch as described above. In the example shown in FIG. 6, anchor point 610 represents an entry point into the region of code that includes the branch being predicted. In this example, the portion of the data structure 605 to the left of the anchor point 610 represents the history of taken branches leading into the region of code that includes the branch being predicted, and the portion of the data structure to the right of the anchor point 610 represents predicted taken branches within the region of code that includes the branch being predicted. In this example, the number "X" of the GPV 512 equals 10.

In the example shown in FIG. 6, at time t1, no taken branches have been predicted past the anchor point 610. As such, at time t1 the GPV 512 includes the 10 bits immediately preceding the anchor point 610 and the counter 513 equals 0.

In this example, at time t2, the system has predicted 1 taken branch past the anchor point 610. As such, at time t2 the GPV 512 includes the 10 bits immediately preceding the anchor point 610 and the counter 513 equals 1.

In this example, at time t3, the system has predicted 2 taken branches past the anchor point 610. As such, at time t3 the GPV 512 includes the 10 bits immediately preceding the anchor point 610 and the counter 513 equals 2.

As illustrated by the example shown in FIG. 6, in aspects the GPV 512 stays static while the counter 513 increments for each predicted taken branch with the region of code past the anchor point. This is in contrast to systems where the GPV is changed with each branch prediction. In embodiments, when a new anchor point is established (e.g., for a different 128B line of code), the counter 513 resets to zero and the GPV 512 is modified to include the "X" number of bits that represent a sequential history of the last "X" number of taken branches to arrive at the new anchor point.

In accordance with further aspects of the invention, a second GPV referred to as the TagGPV 515 represents the last "X" number of taken branches inclusive of those after the anchor point 610. As illustrated in the example shown in FIG. 6, the TagGPV 515 changes with each successive predicted taken branch with the region of code (i.e., after the anchor point 610).

Referring back to FIG. 5, in embodiments the logic 500 includes a tag generator 520 that operates to generate a tag (TAG) that is stored in the PHT 505. In embodiments, the tag generator 520 generates the tag using a function of the branch address 516 and the TagGPV 515. In embodiments, the function is an XOR function although different hash functions may be used. In embodiments, the branch address 516 is based on the instruction address of the branch being predicted. In one example, using a 64-bit address, the branch address 516 comprises bits 50:62 of the instruction address of the branch being predicted. In this manner, the tag includes information on both the branch being predicted and the path taken to arrive at the branch being predicted, as opposed to containing only information about the branch being predicted. In some embodiments, the counter 513 is not limited such that it may achieve values that exceed the number of entries in the PHT 505. In these embodiments, the use of a tag generated by the tag generator 520 using the TagGPV 515 alleviates aliasing that might otherwise occur if the tag was based only on the branch being predicted.

Figure 7:
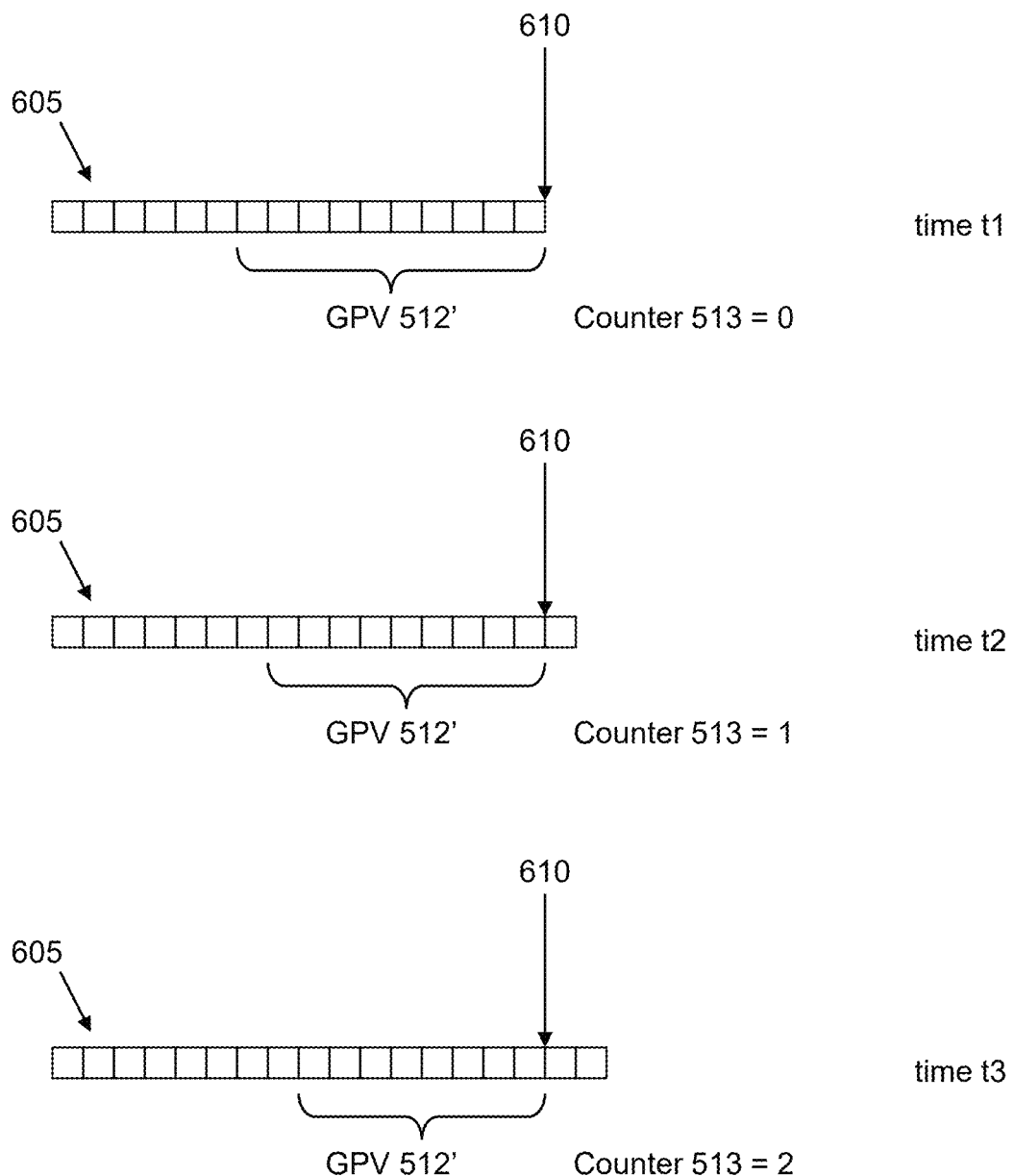
FIG. 7 shows an example of modifying a global path vector in accordance with aspects of the invention.

In accordance with some aspects, the GPV 512 is modified as the counter 513 increments. In one example, the number of entries included in the GPV 512 is reduced as the counter 513 increments. FIG. 7 illustrates an example in which the GPV 512' is reduced by one unit each time the counter increments. For example, the GPV 512' includes 10 bits when the counter 513 equals 0 at time t1. In this example, the GPV 512' is reduced in size to 9 bits when the counter 513 increments to 1 at time t2. Continuing this example, the GPV 512' is reduced in size to 8 bits when the counter increments to 8 at time t3, and so on. In this example, modifying the GPV 512' includes removing (or zeroing) the bit that corresponds to the oldest taken branch contained in the GPV 512' (e.g., as shown at the left side of the GPV 512' in FIG. 7) for each increment of the counter 513. Other modifications of the GPV 512 based on the incrementing of the counter 513 may be used.

Aspects of the invention have been described thus far with each region of code being defined in a static nature, e.g., a 128B line of code as defined in the BTB. However, implementations may also utilize dynamically determined regions of code. In one example, the anchor point for a region of code may be defined by a resolved branch that was predicted incorrectly which resulted in a branch flush restart of the prediction pipeline. In this example, the address 511 would be based on the instruction address of the resolved branch, the GPV 512 would include "X" number of bits that represent a sequential history of the last "X" number of taken branches to arrive at the new anchor point (i.e., the resolved branch), and the counter 513 would reset to zero beginning at the new anchor point and increment for each predicted taken branch after the new anchor point. In another example, the anchor point for a dynamically determined region of code may be defined by a point of restart after a branch flush restart of the prediction pipeline. In this example, the point of restart may be a next instruction address after a resolved branch that was predicted incorrectly and that resulted in the branch flush restart. In this example, the next instruction address after the resolved branch may be a next sequential instruction address or a target of the resolved branch. Another example of a dynamically determined region of code uses an anchor point that is based on saturation of the counter 513. In this example, when the counter 513 reaches a predefined upper limit, the system creates a new anchor point at that branch, adjusts the GPV 512 based on the new anchor point, and resets the counter 513 to zero.

Aspects of the invention may utilize plural different PHTs each having a different way of defining its anchoring point. For example, a first PHT may be associated with an anchoring point that is based on the most recent branch wrong prediction, a second PHT may be associated with an anchoring point that is based on the second most recent branch wrong prediction, a third PHT may be associated with an anchoring point that is based on the third most recent branch wrong prediction, etc. The example described above includes different tables all using a same type of dynamically determined anchoring point, e.g., an anchoring point based on a branch wrong prediction. However, different tables may use different types of dynamically determined anchoring points. For example, a first PHT may be associated with an anchoring point that is based on the most recent branch wrong prediction, and a second PHT may be associated with an anchoring point that is based on function calls that exhibit multiple targets. Such implementations provide for the use of dynamic history lengths instead of static history lengths, such as those used in TAGE (TAgged GEometric length predictor) systems. Using plural tables with different anchoring points, and thus using dynamic history lengths, provides faster learning and greater accuracy while minimizing the total number of required tables.

Figure 8:
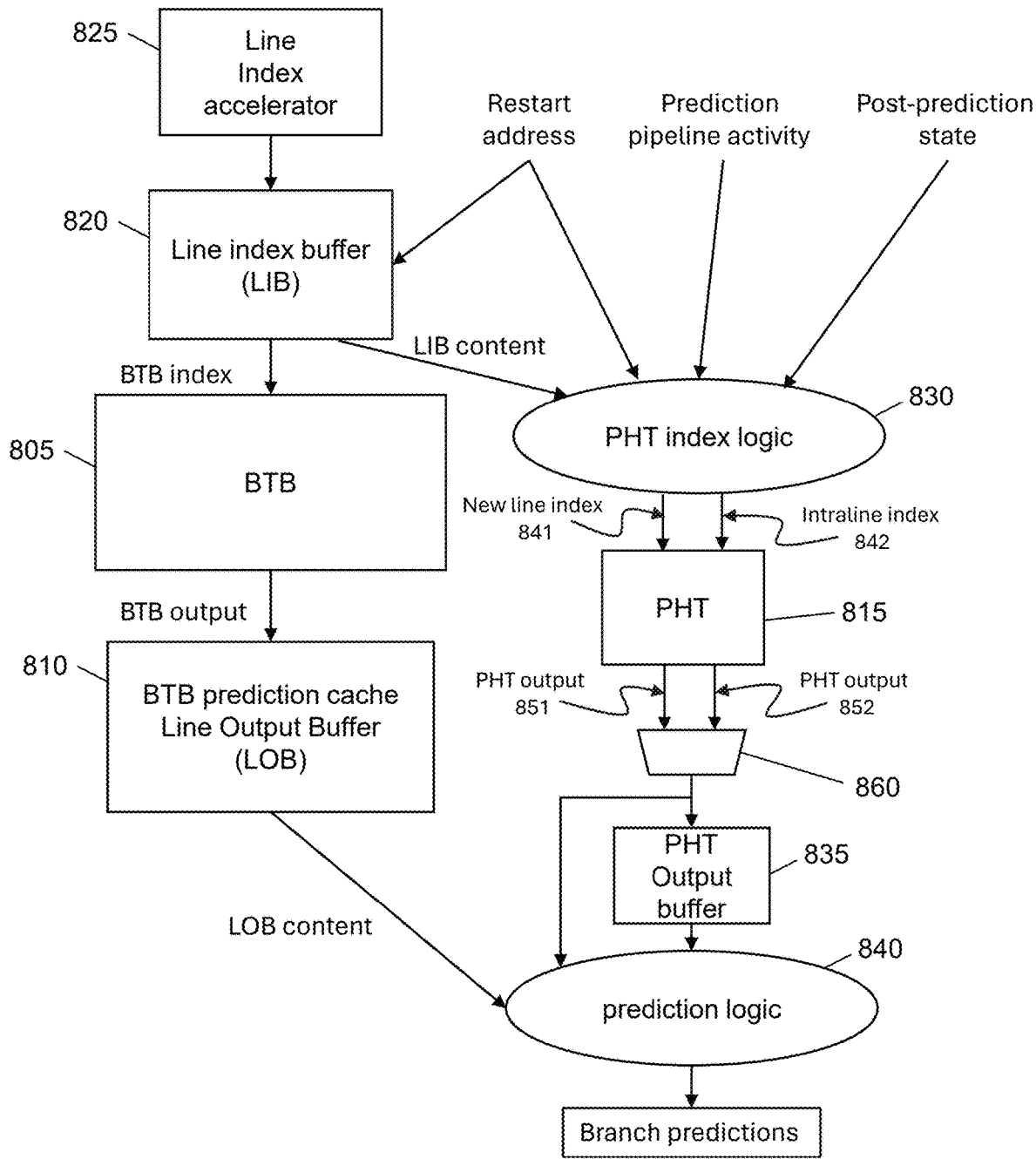
FIG. 8 shows an example of logic for generating a speculative intraline index of pattern-based predictors in accordance with aspects of the invention.

FIG. 8 shows an example of logic for generating a speculative intraline index of pattern-based predictors in accordance with aspects of the invention. The embodiment shown in FIG. 8 is in the context of a branch predictor with a primary branch target buffer (BTB) 805 predictor with a line output buffer (LOB) 810 prediction cache. A pattern history table (PHT) 815 is used as the example of a pattern-based predictor. Embodiments of the invention are not limited to only these types of predictors. Other types of metadata predictors (beyond branch predictors) can be employed in implementations of the invention. Other types of pattern-based predictors are possible. Multiple PHTs are possible in a TAGE configuration. Multiple target table (MTT) predictors may also be included as pattern-based predictors utilizing aspects described here.

In a lookahead asynchronous branch predictor, the branch prediction logic gets restarted from the processor pipeline, then runs ahead on its own providing prediction information to the pipeline and redirecting itself upon finding taken branches.

A primary predictor such as a branch predictor's BTB 805 is read on a line basis and its output is written into a prediction cache, the LOB 810, to be reused while making predictions staying within that line.

In embodiments, line addresses are put into a line index buffer (LIB) 820. They come from restart addresses (from the processor pipeline or the prediction pipeline), a line index accelerator 825, or sequential addresses. The index pipeline (e.g., comprising LIB 820, BTB 805, and LOB 810) uses addresses from the LIB 820 to index and read content from the BTB 805 and put the results of those reads into the LOB 810.

In embodiments, the prediction pipeline comprises PHT index logic 830, PHT 815, PHT output buffer 835, and prediction logic 840. In embodiments, the prediction pipeline uses content of the LOB 810 to make predictions between a starting search address and the first predicted taken branch (if there is one). If there is a predicted taken branch that stays within the same line, the next pass in the prediction pipeline reuses the current LOB entry. Otherwise, the next LOB entry is used for the next pass of the prediction pipeline, and it is either the content for the target line following a predicted taken branch to a new line, or the content for a sequential line following either no predictions or only not-taken predictions.

In embodiments, and as described herein, the PHT index logic 830 generates two indexes for a branch prediction: a new line index 841 and an intraline index 842. In embodiments, the PHT 815 includes two read ports, one for each index. In embodiments, the output data of the PHT 815 includes two PHT outputs: PHT output 851 based on the new line index 841 and PHT output 852 based on the intraline index 842. In embodiments, the system generates the two indexes and the two corresponding PHT outputs because often, at the time of generating the indexes and the outputs, the prediction logic 840 does not yet know whether it will utilize a prediction based on staying within the line or a prediction based on a new line. By generating both indexes and both PHT outputs ahead of time in this manner, both PHT outputs are ready for use by the prediction logic 840 immediately when the prediction logic 840 determines whether to stay in the line or go to a new line, and the system selects which of the PHT outputs to use at this stage. In this manner, implementations of the invention increase the speed of the prediction pipeline.

Figure 9:
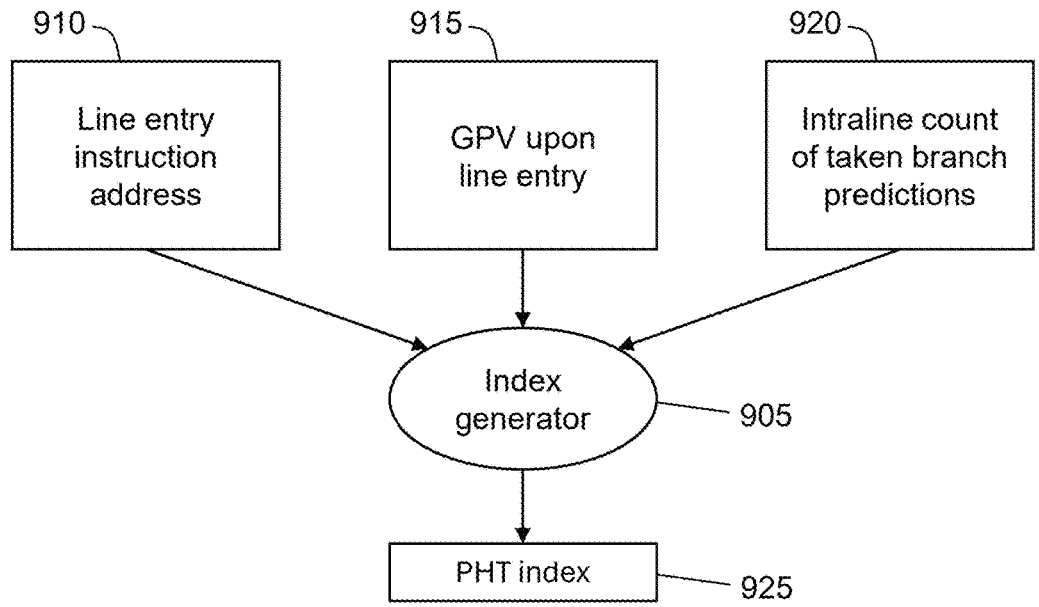
FIG. 9 shows a block diagram for generating an index used with a pattern history table in accordance with aspects of the invention.

FIG. 9 shows a block diagram for generating an index used with a pattern history table (e.g., PHT 815 of FIG. 8) in accordance with aspects of the invention. In implementations, the PHT index logic 905 (which corresponds to PHT index logic 830 of FIG. 8) generates a PHT index as a function of the path taken to get to the branch. In this manner, the PHT is indexed as a function of the branch's instruction address, as represented by element 910, and a global path vector of hashed instruction addresses of prior branches. However instead of including all prior branches in the history, the state of the history upon entering into a line of code is used, as represented by element 915. Then when in that line, an additional factor, an intraline count, as represented by element 920, is incorporated. This count can be the count of taken predicted branches within the line. Upon entering the line, it is 0. It is incremented by 1 upon each subsequent predicted taken branch. One advantage of using the line-entry history status in combination with an intraline count is to make it possible to update the index by incrementing the count while staying within a line. In this manner, the index is not dependent on specific information about the branches predicted while in the line, but only dependent on the number of taken intraline branches predicted. In one example, elements 905, 910, 915, and 920 of FIG. 9 are implemented using index generator 508, address 511, GPV 512, and counter 513, respectively, of FIG. 5. In embodiments, the PHT index 925 generated by the index generator 905 is the new line index 841 or the intraline index 842, depending on which data is used for elements 910, 915, and 920, as described next with respect to FIG. 10.

Figure 10:
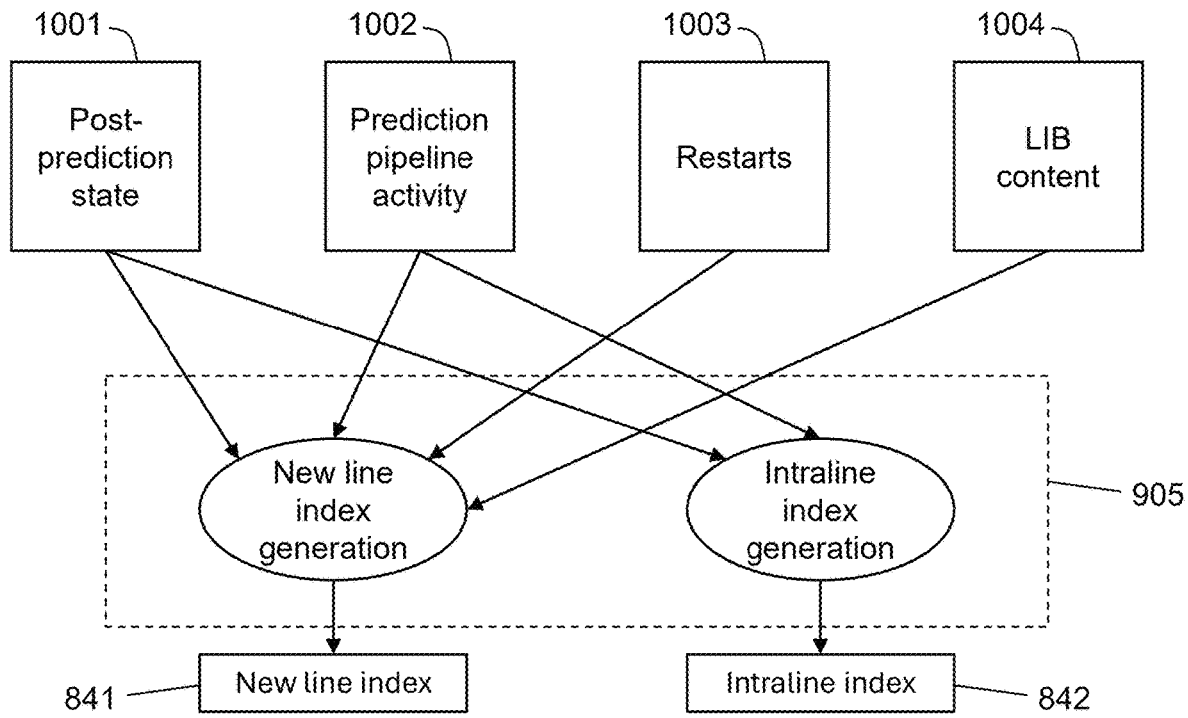
FIG. 10 shows a block diagram for generating a new line index and an intraline index used with a pattern history table in accordance with aspects of the invention.

FIG. 10 shows a block diagram for generating the new line index 841 and the intraline index 842 used with the PHT 815 (of FIG. 8) in accordance with aspects of the invention. In embodiments, when generating the new line index 841, the index generator 905 uses information from the post-prediction state 1001, prediction pipeline activity 1002, restarts 1003, and LIB content 1004 to determine the content of element 910 (line entry instruction address), element 915 (GPV upon line entry), and element 920 (intraline count of taken branch predictions). In embodiments, when generating the intraline line index 842, the index generator 905 uses information from the post-prediction state 1001 and prediction pipeline activity 1002 to determine the content of element 910 (line entry instruction address), element 915 (GPV upon line entry), and element 920 (intraline count of taken branch predictions).

In embodiments, the post-prediction state 1001 is information about the state of the prediction pipeline that is updated upon making predictions at the end of the prediction pipeline. This information may include a new line entry address, a new GPV, and a new count, for example.

In embodiments, the prediction pipeline activity 1002 is information about the activity of predictions that are currently being made in the prediction pipeline. It may include, for example, information about b2, b3, and b4 cycles, as described herein.

In embodiments, restarts 1003 are events that cause speculation to be rolled back and processing to resume at a particular instruction address with history state based on instructions older than the restart point. As a result, restarts can cause a change to the line entry address, GPV, and count that are indicated by the post-prediction state 1001.

In embodiments, the LIB content 1004 is information about the line instruction addresses and global path history to get there. In embodiments, the LIB content 1004 includes the line instruction addresses. It also contains indications of how it was installed: sequential lines or target lines from the line index accelerator or prediction pipeline. When from target lines, the line index accelerator also includes information about the taken branch that it predicts jumps into that line, e.g., the GPV value that taken branch shifts into the history vector.

Referring back to FIG. 8, because the pattern-based predictors are indexed in advance of being used, the status of prior prediction(s) still in the prediction pipeline may be unknown at the time a new index is needed. Embodiments solve this problem by providing pattern predictors (e.g., PHT 815) that include multiple read ports. In embodiments, at least one read port is configured to assume intraline indexing by assuming predictions will be made with intraline targets from the current/oldest LOB entry, and at least one other read port is configured to assume new line indexing assuming advancement to the next/younger LOB entry. Depending on the implementation, different numbers of read ports may be used. The example shown in FIG. 8 and described below uses two read ports: one read port for a new line index 841 and one read port for an intraline index 842.

In embodiments, the pattern-based predictors are indexed in two circumstances. In a first circumstance, indexing is triggered by index pipeline restarts (either external restarts from the processor pipeline or restarts from the prediction pipeline that redirects the branch prediction search differently from what line index accelerator or sequential LIB population assumed). In a second circumstance, indexing is triggered by a valid cycle in the prediction pipeline (for example, every b2 cycle as described herein).

With continued reference to FIG. 8, in embodiments the pattern predictor outputs (e.g., PHT outputs 851, 852) may not be needed by the prediction pipeline immediately. For example, the pipeline may need to stall if downstream consumers of branch prediction information are not ready to receive any. Therefore, in embodiments, a capability to capture the pattern predictor output and save it for later is provided. In embodiments, the PHT output buffer 835 serves this purpose.

In embodiments, when feeding pattern predictor data into the prediction logic 840 of the prediction pipeline, it can come from the array (e.g., PHT 815) or the saved state (e.g., PHT output buffer 835). In embodiments, the array outputs from the various ports are multiplexed at 860 to select the appropriate port's output based on the status of older branch predictions in the pipeline, e.g., whether they had an intraline prediction or not.

Figure 11:
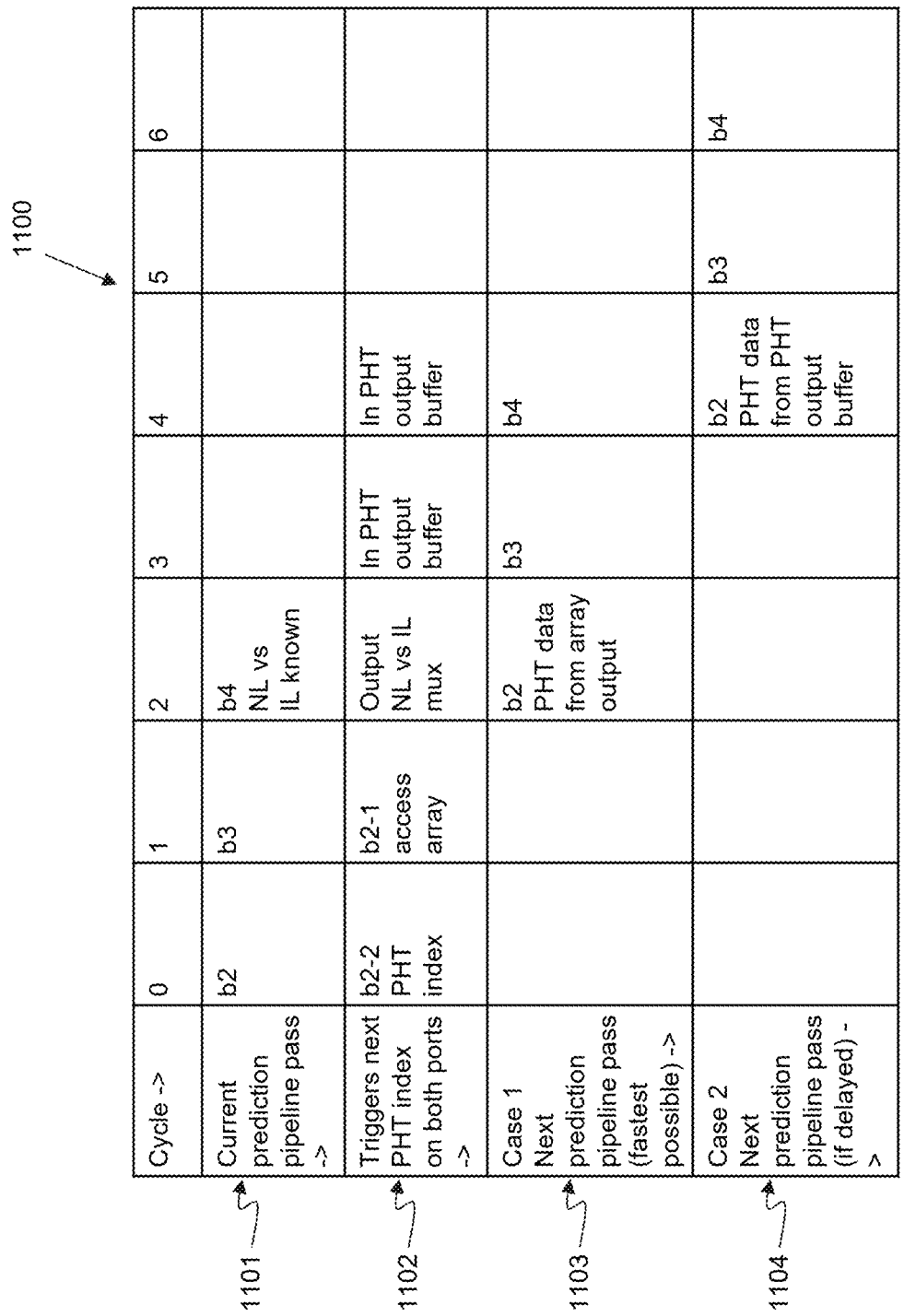
FIG. 11 shows a table of cycles of a prediction pipeline in accordance with aspects of the invention.

FIG. 11 shows a table 1100 that describes an exemplary use case of cycles of a prediction pipeline in accordance with aspects of the invention. Cycles 0-6 are depicted in columns. A current prediction pipeline pass is depicted in row 1101. Row 1102 depicts actions triggered by activities in row 1101. Row 1103 depicts a first alternative case in which the next prediction pipeline pass is immediately ready for the PHT output. Row 1104 depicts a second alternative case in which the next prediction pipeline pass is not immediately ready for the PHT output.

In this example, each prediction pipeline pass starts in a b2 cycle, and the prediction for this pass status will be known in the b4 cycle. In the b4 cycle, the concurrent b2 cycle (the next possible b2 cycle for this thread) is either from the same line (oldest LOB entry) or the next line (second oldest LOB entry). Which one to use in the b2 cycle of the next pass is based on the newline vs intraline status of the b4 cycle of the current pass of the prediction pipeline.

In this example, a valid b2 cycle in the prediction pipeline is the trigger for indexing the pattern predictor (e.g., PHT 815 of FIG. 8).

In this example, cycle 0 is the b2 cycle of the current prediction pipeline pass (row 1101), and this triggers the next PHT index, called a "b2-2" cycle (row 1102).

In this example, cycle 1 is the b3 cycle of the current prediction pipeline pass (row 1101), and it is the b2-1 cycle of the PHT array access (row 1102).

In this example, cycle 2 is the b4 cycle of the current prediction pipeline pass (row 1101). In this cycle it is known whether or not there is an intraline taken prediction. That indication allows selection of the PHT array output data from either the new line or intraline read port. In embodiments, the selected data is written into the PHT output buffer 835 of FIG. 8.

In this example, in case 1 (row 1103), if the prediction pipeline is ready for a valid b2 cycle in cycle 2, then the PHT output data is chosen from the array output after the multiplexing (e.g., at 860 in FIG. 8). In this case, the PHT output data (e.g., one of PHT output 851 and PHT output 852 of FIG. 8) is selected by the multiplexer 860 and then provided directly to the prediction logic 840 of FIG. 8.

In this example, if the prediction logic 840 of the prediction pipeline is not ready for the PHT output data at cycle 2 (e.g., is delayed), then there is no valid b2 cycle in cycle 2 and the next valid b2 cycle happens at some time in the future. This is depicted in case 2 (row 1104), which shows the next valid b2 cycle occurring in cycle 4 in which case the PHT output data is taken from the PHT output buffer 835.

According to aspects of the invention, the pattern-based predictors can be written (e.g., to the PHT 815) non-speculatively at completion time with an index generated based on information of new line and intraline-based state. In embodiments, to facilitate this, during the completion stage the GPV and address are snapshot at line entry and the current state is maintained.

In embodiments, during completion stages, there can be multiple groups completing at a same cycle. Each group can have limitations on the number of instructions, branches, and types of branches present. Different combinations of new line vs intraline are possible depending on the "N" number of branches. In embodiments, to enable the intraline count in index generation, the GPV and entry instruction address at line entry are taken as a snapshot. In embodiments, current values are also updated upon all completing branches and maintained. In embodiments, the intraline count is incremented as long as the subsequent taken branch remains intraline. In embodiments, the intraline count, line entry GPV, and line entry address are used to generate the index. Furthermore, upon restarts the state can be updated as if entering into a new line to be consistent with the prediction logic restarting in the same way.

According to aspects of the invention, the GPV for the line entry is snapshot in following cases: there is a restart and a last GPV calculated for a taken branch is used to snapshot; there is a restart and group crosses a line sequentially; and there is branch to a new line.

In embodiments, knowledge of first instruction after restarts can be tracked through the processor pipeline in whatever manner instructions are being tracked. One example is to utilize a global completion table.

In embodiments, for all groups completing in a single cycle, there can be different combinations of taken branches in a group, the group crossing a line, and a branch position within the line. The following are examples in a system with two groups completing and at most one taken branch in a group. In one example, the first group crosses a line sequentially and the branch within the group goes to a new line. In another example, the first group has a branch and causes line crossing, and the subsequent group completing in same cycle crosses the line sequentially. In another example, the first group crosses a line sequentially and the branch within the current group crosses the line again and branch in subsequent group remain within the line. In another example, the first group crosses a line and the branch within the current group goes back to previous line. In another example, both groups completing from same thread with different combination of branch line crossing and groups crossing sequentially. Correct detection of the line entry and snapshot of the corresponding GPV, in a manner described herein, enables the efficiency of PHT index generation during completion cycle to feed the PHT.

In embodiments, depending on specifics of the number of different pattern-based predictors, and the index functions of them, certain GPV bits can be combined with certain intraline count bits before transmitting to the index generation logic and array structures themselves. This can minimize the number of writes required. For example, bit 0 of the GPV can be XOR'ed with intraline count bit 0, and subsequently transmitted to write queues to be used for subsequent index generation for multiple structures, for example PHT and CTB.

As described herein, a prediction pipeline does not know whether a taken branch has an intraline target or new line target early enough to affect the next pattern-predictor index. Embodiments of the invention solve this problem by providing a pattern-predictor (e.g., PHT 815) that has two read ports in which one port is configured based on an assumption there will be a new line target, and one port is configured based on an assumption there will be an intraline target. In embodiments, generating a new intraline index requires only incrementing the counter. This is because the line entry address and line entry GPV are stable and don't depend on the result of the prediction pipeline which is not available yet at the time the index is needed. In this manner, the intraline index is not dependent on information from intraline predictions, and instead is only based on the number of intraline predictions. Using this technique, embodiments are able to speculatively index by generating two indexes (i.e., the new line index and the intraline index) and corresponding PHT outputs before it is known which output will be used, and then selecting the appropriate output to use when the new line versus intraline determination is made in a later cycle. In this manner, implementations of the invention provide a method of using an index function incorporating intraline branch count and line-entry pattern history, triggered by the prediction pipeline, and multiple read ports to index speculatively assuming entering new line and assuming staying in same line before the actual predictions are made. In embodiments, the method includes using prediction pipeline results of new line vs intraline status to select the appropriate pattern predictor output port. In embodiments, the method includes retaining pattern-predictor output and using it later if the prediction pipeline is delayed.

Figure 12:
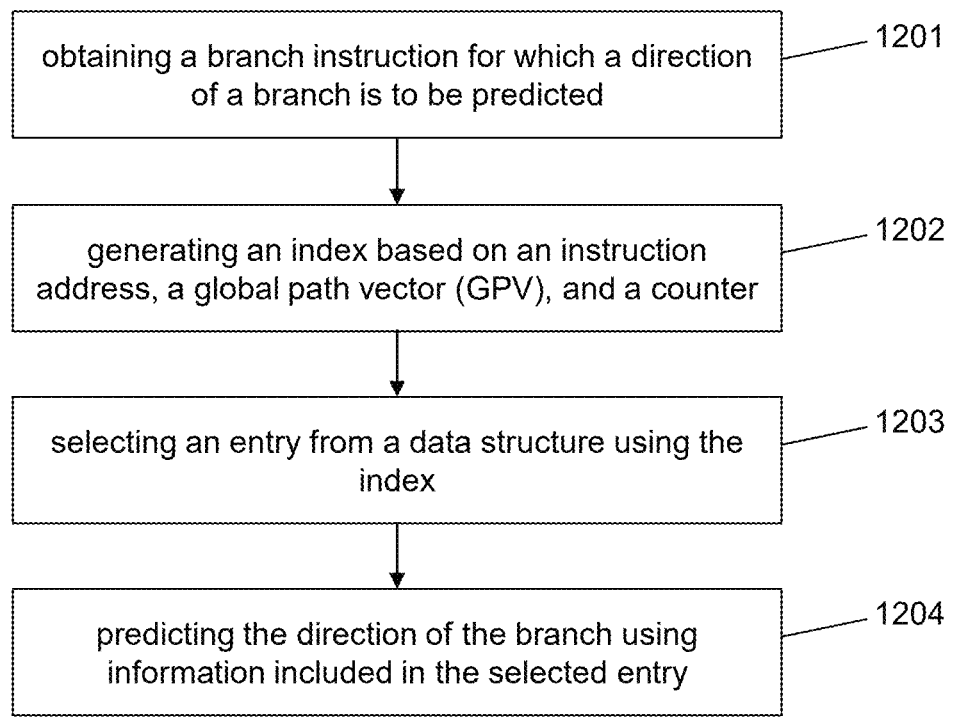
FIG. 12 shows a flowchart of an exemplary method in accordance with aspects of the invention.

FIG. 12 shows a flowchart of an exemplary method of branch prediction in a processor in accordance with aspects of the present invention. Steps of the method may be carried out using the logic of FIG. 5 and are described with reference to elements depicted in FIG. 5. In embodiments, the method comprises: obtaining a branch instruction for which a direction of a branch is to be predicted (step 1201); generating an index based on an instruction address, a global path vector (GPV), and a counter (step 1202); selecting an entry from a data structure using the index (step 1203); and predicting the direction of the branch using information included in the selected entry (step 1204). The instruction address may be address 511 of FIG. 5 and may comprise an address of a region of code that includes the branch being predicted. The GPV may be GPV 512 and may comprise information defining a history of branches taken to an anchor point in the region of code. The counter may be counter 513 and may comprise a count of predicted taken branches within the region of code after the anchor point. The method may include modifying the GPV based on a value of the counter, and the modifying the GPV comprises reducing a size of the GPV in response to a value of the counter increasing (e.g., as described at FIG. 7). The data structure may comprise a pattern history table such as PHT 505 of FIG. 5. The information included in the selected entry of the PHT is, for instance, a saturation counter. The method may include modifying a tag (e.g., TAG of FIG. 5) in the selected entry in the PHT based on a tag GPV (e.g., TagGPV 515 of FIG. 5). The predicting the direction at step 1204 may be performed using prediction logic 509 of FIG. 5. The method may include using the predicted direction of the branch for executing one or more instructions by the processor.

Figure 13:
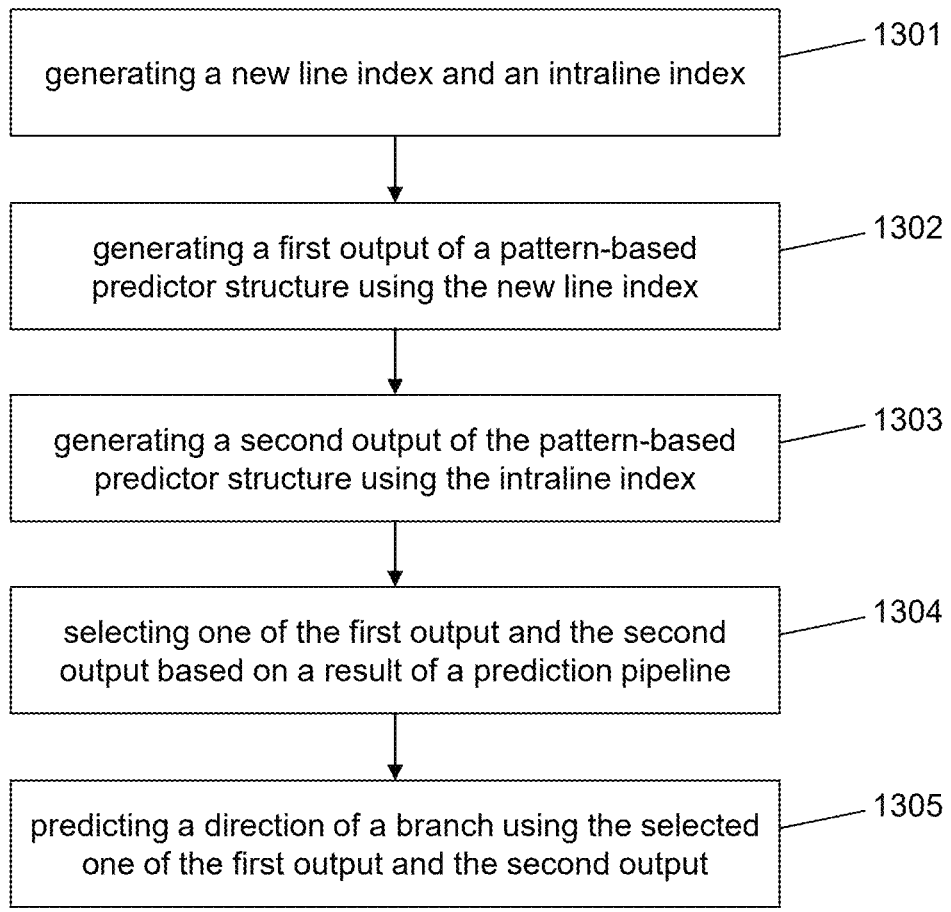
FIG. 13 shows a flowchart of an exemplary method in accordance with aspects of the invention.

FIG. 13 shows a flowchart of an exemplary method of branch prediction in a processor in accordance with aspects of the present invention. Steps of the method may be carried out using the logic of FIG. 8 and are described with reference to elements depicted in FIG. 8. In embodiments, the method comprises: generating a new line index and an intraline index (step 1301); generating a first output of a pattern-based predictor structure using the new line index (step 1302); generating a second output of the pattern-based predictor structure using the intraline index (step 1303); selecting one of the first output and the second output based on a result of a prediction pipeline (step 1304); and predicting a direction of a branch using the selected one of the first output and the second output (step 1305). In embodiments, the generating the new line index and the intraline index is triggered at a first cycle of a pass of the prediction pipeline, and the result of the prediction pipeline is a result of a second cycle of the pass of the prediction pipeline after the first cycle of a pass of the prediction pipeline. In embodiments, the predicting the direction of the branch using the selected one of the first output and the second output is performed in another pass of the prediction pipeline. In embodiments, the pattern-based predictor structure has a first read port associated with the new line index and a second read port associated with the intraline index. The method may include storing the selected one of the first output and the second output in a buffer based on the prediction pipeline being delayed. In embodiments, the new line index and the intraline index are each generated using a line entry instruction address, a global path vector (GPV) leading up to the line entry instruction address, and an intraline counter of predicted taken branches. The method may include using the predicted direction of the branch for executing one or more instructions by the processor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of branch prediction in a processor comprising a lookahead asynchronous branch predictor, the method comprising:
   obtaining, by the processor, a branch instruction for which a direction of a branch is to be predicted;
   generating, by the processor, an index based on an instruction address, a global path vector (GPV), and a counter, the GPV being a vector that defines a history of branches taken leading into an anchor point in a region of code that includes the branch, wherein the counter is a count of predicted taken branches within the region of code after the anchor point;
   dynamically determining the region of code by selecting the anchor point based on an event, wherein the event is one of a branch flush restart and saturation of the counter;
   selecting, by the processor, an entry from a data structure using the index; and
   predicting, by the processor, the direction of the branch using information included in the selected entry.

2. The method of claim 1, wherein the instruction address is an address of the region of code.

3. The method of claim 1, further comprising modifying the GPV based on a value of the counter.

4. The method of claim 1, wherein the region of code is a line of code.

5. The method of claim 4, wherein the anchor point is an entry point into the line of code.

6. The method of claim 1, wherein the event is the branch flush restart.

7. The method of claim 1, wherein the GPV includes information for taken branches leading into the region of code, and does not include information regarding taken branches within the region of code.

8. The method of claim 1, wherein the GPV includes a subset of bits of a history data structure that represents a history of taken branches in sequential order from oldest to most recent.

9. A method of branch prediction in a processor, the method comprising:
   obtaining, by the processor, a branch instruction for which a direction of a branch is to be predicted;
   generating, by the processor, an index based on an instruction address, a global path vector (GPV), and a counter;
   selecting, by the processor, an entry from a data structure using the index; and
   predicting, by the processor, the direction of the branch using information included in the selected entry; and
   further comprising reducing a size of the GPV in response to a value of the counter increasing.

10. The method of claim 9, wherein the data structure is one of plural data structures each associated with a different anchor point.

11. The method of claim 9, wherein the data structure is a pattern history table (PHT).

12. The method of claim 11, further comprising modifying a tag in the selected entry in the PHT based on a tag GPV.

13. The method of claim 9, wherein the data structure is an only branch prediction structure used to make a prediction for the branch.

14. The method of claim 9, wherein the index is generated using a 3-way exclusive OR function that receives the instruction address, the GPV, and the counter as inputs and generates the index as an output.

15. A method of branch prediction in a processor, the method comprising:
- obtaining, by the processor, a branch instruction for which a direction of a branch is to be predicted;
- generating, by the processor, an index based on an instruction address, a global path vector (GPV), and a counter, the GPV being a vector that defines a history of branches taken leading into an anchor point in a region of code that includes the branch;
- selecting, by the processor, an entry from a data structure using the index; and
- predicting, by the processor, the direction of the branch using information included in the selected entry, wherein:
- each respective one of plural bits in the GPV has a value equal to a predefined bit of a respective target instruction address of a respective taken branch leading into the region of code.

* * * * *